Oct. 18, 1966   H. WEBERS   3,280,293
DEVICE FOR ADJUSTING THE SPACING BETWEEN
THE ELECTRODES OF A GRATE WELDER
Filed April 27, 1965
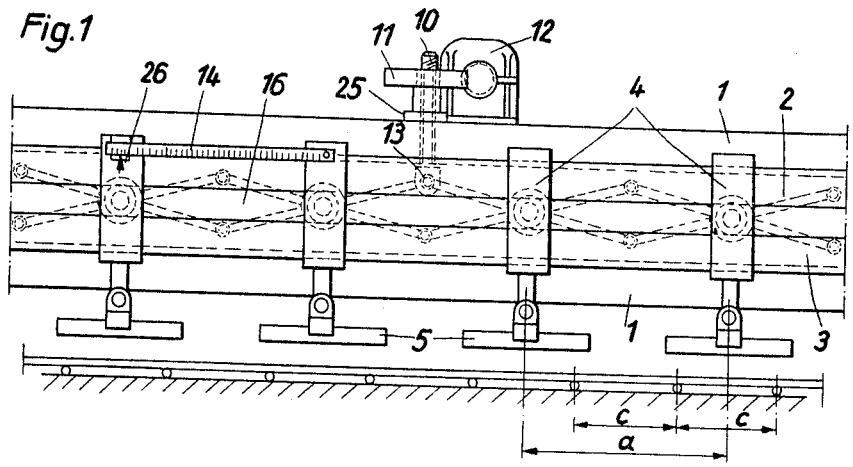
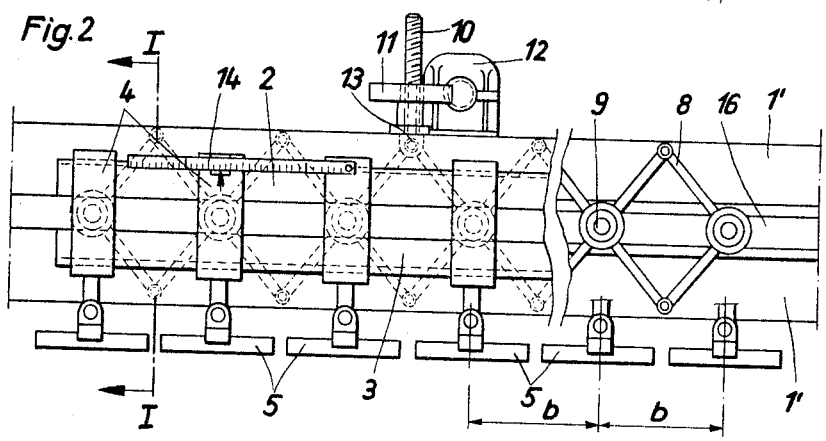
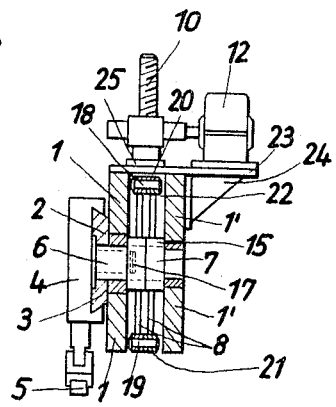
Inventor:
Heinz Webers,
By His Attorney.

United States Patent Office 3,280,293
Patented Oct. 18, 1966

3,280,293
DEVICE FOR ADJUSTING THE SPACING BETWEEN THE ELECTRODES OF A GRATE WELDER
Heinz Webers, Osterrath, Germany, assignor to Bau-Stahlgewebe G.m.b.H., Dusseldorf-Oberkassel, Germany, a German corporation
Filed Apr. 27, 1965, Ser. No. 451,138
Claims priority, application Germany, Apr. 29, 1964,
B 76,585
7 Claims. (Cl. 219—56)

The invention relates to grate welding machines, and relates more particularly to a device for adjusting the distance between adjustably positionable electrodes of such a welding machine and, if desired, also of the longitudinal rod inlets thereof.

In grate welding machines now in use, a series of pressure units are slidably positoned on guide rails of a welding beam; and each pressure unit carries an electrode bridge.

The adjustment of the position of the individual pressure units on the guide rails on the devices of the prior art, however, is carried out by hand, so that the distance between the electrodes can usually not be kept within fine tolerances. Furthermore, the manual adjustment is time consuming and hence expensive.

This additional time and expense spent is particularly disadvantageous when the spacing between the electrodes needs to be adjusted frequently, for instance, during the manufacture of structural steel grates or mats. Grates of this type have longitudinal rods and cross rods, and the distance between the longitudinal rods depends on the magnitude of the necessary cross section of the rods, and hence must be adjustable. In order to vary these distances, there are being used, as stated hereinbefore, movable pressure units that carry electrode bridges.

In order to avoid the constant changing of the spacing between pressure units, it has been proposed to restrict the grates to those with certain distances between the rods only, for instance, of distances of 50, 75, 100 and 150 millimeters. This restriction has, however, the disadvantage that it does not permit to meet all practical demands.

It is, accordingly, among the principal objects of the invention to avoid the aforesaid drawbacks of the prior art.

It is another object of the invention to provide a welding machine on which grates may be produced, the longitudinal rods of which may have any desired distance from each other.

It is a further object of the invention to provide such a welding machine in which the adjusted distances between the pressure units are automatically the same, the pressure units therefore at any time being spaced apart for the same adjusted distance.

It is still another object of the invention to provide such a machine with a device for adjusting the distance between the electrodes and, if desired, also of the longitudinal rod inlets thereof, wherein the electrode carrying pressure units and, if desired, also the longitudinal rod inlets are slidably mounted on guide rails and arranged with a pantograph guide that has equally long arms and the central hinges of which are guided along the said guide rails.

It is still a further object of the invention to provide such a welding machine wherein the adjustment of the position of the space between two pressure units will automatically adjust to the same spacing all the other pressure units, with little energy, great simplicity, and speed and accuracy.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts as set forth in the claims hereof, certain embodiments of the same being illustrated in the accompanying drawings and described in the specification.

For a fuller understanding of the nature and objects of the invention, reference should be had to the following detailed description, taken in connection with the accompanying drawings, in which:

FIG. 1 is a fragmentary elevational view, partly in section, of a grate welding machine in accordance with an embodiment of the invention, showing four pressure units;

FIG. 2 is a fragmentary elevational view, similar to FIG. 1, but showing a portion of the welding beam having its front partly cut away to reveal the inside of the welding beam, and showing six pressure units; and FIG. 3 is a vertical sectional view, taken on the line I—I of FIG. 2.

In carrying the invention into effect in the embodiments which have been selected for illustration in the accompanying drawings and for description in this specification, and referring now particularly to FIG. 1, there is provided a grate welding machine which comprises a welding beam (the supports for the beam are of well-known conventional construction and have not been shown).

The beam is composed of two portions namely a front portion 1 and a rear portion 1' (FIG. 3).

The front portion 1 of the beam carries an upper guide rail 2 and a lower guide rail 3 for supporting slidingly the pressure units 4 in dovetail arrangement. This arrangement has the advantage that the pressure units 4 can only be shifted parallel.

The front and rear portions 1 and 1' define therebetween a vertical slot 22, which may be open on top and bottom, as shown in FIGS. 2 and 3.

The front portion 1 of the beam has a horizontal slot 16, and the rear portion 1' has a similar horizontal slot 16, and these horizontal slots have their median sections at the same height. The slot 16 of the front portion 1 projects frontwardly through the upper and lower guide rails 2 and 3.

A bolt 6 is connected to each pressure unit 4, and is mounted coaxially on a central hinge pin. For this purpose, each hinge pin is provided wth a central cavity 17 which serves to receive the bolt 6 centrally coaxially of the hinge pin 7.

A lazy-tong or pantograph guide is provided for adjusting the position of the pressure units 4 sliding on the guide rails 2 and 3. The pantograph guide comprises a plurality of substantially equally long arms 8 which are interlinked with each other by three groups of hinges: namely, central hinges 9, and upper and lower hinges. Each central hinge 9 comprises one of said central pins 7, and two bearings each being carried by an arm 8 and surrounding the central pin 7. The two arms 8 of each central hinge 9 cross each other.

As previously stated, each pressure unit 4 is connected with its bolt 6 to the hinge pin 7 of a central hings. The hinge pin 7, as well as the bolt 6, protrude through the slot of the front beam portion 1 between the upper and lower guide rails 2 and 3. This serves to connect in a simple fashion all of the pressure units 4 to the pantograph guide, by connecting each pressure unit 4 to its respective central hinge.

The pantograph guide furthermore comprises upper hinges that link the upper ends of the arms 8, and lower hinges that link the lower ends of the arms 8; and each upper hinge includes an upper pin 18 and two bearings 20, each carried by an arm 8 and surrounding the upper pin 18; similarly, each lower hinge includes a lower pin 19, and two bearings 21, each carried by an arm 8 surrounding the lower pin 19.

The arms 8, and the bearings 15, 20 and 21, are all disposed in the vertical slot 22. This has the advantage of protecting the pantograph guide, and of preventing any sideward movement of the pressure units 4 independently of, and in addition to, the dovetail guiding arrangement thereof.

As best shown in FIG. 3, each central pin 7 is guided in the horizontal slots 16; in the views, two of these slots are shown, but the pin needs to be guided by at least one of them, namely the frontal slot 16 of the front portion 1. This guiding of the central pin 7 has the advantage to increase the stability of the device, and to decrease the wear.

The number of arms 8, and therewith of the pressure units 4, is variable. At any time, pressure units 4 may be added or removed, to adjust the device to all requirements of practice as they occur. As an example of this variability, there have been shown four pressure units 4 in FIG. 1 and six pressure units 4 in FIG. 2.

At the top of the beam there is provided a plate 23 which is supported by a console 24. On the plate 23 there is supported an electric motor 12 which drives a worm 11. The worm 11 coacts with a threaded spindle 10 which is either raised and lowered by the worm 11, or is being turned by the worm 11, and is raised and lowered in a threaded nut 25.

The spindle 10 is connected to one of the upper hinge pins 18, preferably near midway of the length of the pantograph guide, as shown in FIGS. 1 and 2. Through the upper pin 18, the spindle 10 is connected to the respective upper hinge.

The worm 11, together with the motor 12, is preferably movable horizontally on the beam, as this may be of importance upon changing the width of the grates to be manufactured.

A scale 14 may be provided on one of the pressure units 4, and the adjoining pressure unit 4 may carry an indicator 26, the horizontal position of which coincides with the axis of the bolt 6 of that pressure unit 4. The zero position of the scale may coincide vertically with the position of the axis of the bolt of the pressure unit 4 to which the scale 14 is attached. The scale may be mounted tiltably or removably, for the sake of convenience.

The operation of the above-noted device is as follows:

From the number of longitudinal rods of the grate to be manufactured, the number of the necessary pressure units 4 can be calculated. Each pressure unit 4 usually serves for the welding of two longitudinal rods with one cross rod, so that normally, where an electrode bridge is used with each pressure unit, there will be present an even number of longitudinal rods. If, on the other hand, it is desired to use in the grate an odd number of longitudinal rods, the operator may either shunt one of the electrodes, or replace one of the electrode bridges with a single electrode.

The distance $a$ (FIG. 1) or $b$ (FIG. 2) between the pressure units 4 equals twice the size of the distance $c$ between the longitudinal rods. In order to adjust the distances $a$, or $b$, respectively, the operator will energize the motor 12 to move the spindle 10 vertically. By this movement, the pantograph guide is activated and the central pins 7 are moved horizontally. The pressure units 4, owing to their connection to the central pins 7 through the bolts 6, will slide along with the central pins 7, on the guide rails 2 and 3.

As previously mentioned, pressure units 4 may be added or taken off, as needed. The adjusted distance $a$ (or $b$) between any two pressure units 4 will be the same for all the pressure units for this particular adjustment and can be read off the scale 14.

The adjustment is made quickly and accurately; this brings about an increase in the output of the machine, particularly during small runs.

The device may, however, be so arranged that the operating spindle may be positioned near the bearing. The opening and closing of the pantograph guide, and thereby the increase and decrease of the distance between the pressure units 4 would then take place at one side. This may require a special construction of such a bearing with the ends of the lever arm sliding on a guide track.

It is furthermore possible, for instance by using another worm with a spindle, to move a pantograph guide system which so adjusts the system of longitudinal rod inlets, that simultaneously with the positioning of the electrodes 5 there will also be positioned the longitudinal rods in accordance therewith.

In all these embodiments the welding takes place when the beam with the pressure units mounted thereon is being lowered. After each welding step, the beam will again be raised.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a device, for use in adjusting the distance between adjustably positionable electrodes of a grate welding machine including a welding beam and a series of electrode carrying pressure units slidably supported by and adjustable on said beam, in combination, said beam including guide rails supporting said pressure units non-tiltably slidably, and a lazy-tong guide comprising a plurality of equally long arms, hinges each interlinking two of said arms including upper, lower and central hinges, two arms crossing at each central hinge, each pressure unit being connected to and movable along said guide rails by a hinge, the upper and lower hinges linking the upper and lower ends of said arms, respectively, and operating means operable for changing the angular position of the arms of each pair relative to each other thereby adjusting the position of said pressure units on said guide rails.

2. In a device, as claimed in claim 1, said operating means comprising a spindle connected to one of said hinges, and a rotatable gear in driving connection with said spindle, whereby said one hinge may be moved to change thereby the position of all of said hinges and of said pressure units.

3. In device, as claimed in claim 1, said beam being slotted, each central hinge comprising a hinge pin, the hinge pins of said central hinges being guided in the slot of said beam, a bolt mounted coaxially on each hinge pin and being connected to a pressure unit.

4. In a device, as claimed in claim 1, said beam being slotted about midway of its height and one of said guide rails being supported above and the other below the slot of said beam, said guide rails forming dovetail connections with said pressure units.

5. In a device, for use in adjusting the distance between adjustably positionable electrodes of a welding machine including a welding beam and a series of electrode carrying pressure units slidably supported by and adjustable on said beam, in combination, said beam including guide rails supporting said pressure units slidably, and a pantograph guide comprising a plurality of substantially equally long arms, hinges each interlinking two of said arms including central hinges, two arms crossing at each central hinge, each pressure unit being connected to and movable along said guide rails by a central hinge, upper hinges, lower hinges, said upper and lower hinges linking the upper and lower ends of said arms, respectively, and operating means operable for changing the angular position of the arms of each pair relative to each other thereby adjusting the position of said pressure units on said guide rails, said operating means comprising a spindle connected to one of said upper hinges, and a rotatable gear in driving connection with said spindle, whereby said one upper hinge may be raised and lowered, respectively, to change thereby the position of all of said hinges and of said pressure units.

6. In a device, as claimed in claim 5, and a motor in driving connection with said gear, said motor being horizontally slidably positioned on said beam.

7. In a device, as claimed in claim 1, and a scale positioned between two adjoining pressure units and connected to one of them, and indicating means connected to the other pressure unit and cooperating with said scale, whereby the distance between said two pressure units may be read off.

References Cited by the Examiner

UNITED STATES PATENTS

| | | | |
|---|---|---|---|
| 1,258,574 | 3/1918 | Jones | 33—192 |
| 1,307,188 | 6/1919 | Dobbyn | 33—192 |
| 2,469,897 | 5/1949 | Schilling et al. | 219—56 |
| 2,871,567 | 2/1959 | Casten | 33—192 |
| 2,951,574 | 10/1960 | Craig | 74—521 |
| 3,019,328 | 1/1962 | Brashear et al. | 219—125 |

FOREIGN PATENTS 252,464 8/1911 Germany.

RICHARD M. WOOD, *Primary Examiner.*

B. A. STEIN, *Assistant Examiner.*